(12) United States Patent
Valle

(10) Patent No.: US 7,530,330 B1
(45) Date of Patent: May 12, 2009

(54) COMBINATION BIRDFEEDER AND FOUNTAIN

(76) Inventor: Maritza Valle, 1111 N. 76th Ter., Hollywood, FL (US) 33024

(*) Notice: Subject to any disclaimer, the term of this patent is extended or adjusted under 35 U.S.C. 154(b) by 311 days.

(21) Appl. No.: 11/584,272

(22) Filed: Oct. 20, 2006

Related U.S. Application Data

(60) Provisional application No. 60/789,809, filed on Apr. 5, 2006.

(51) Int. Cl.
*A01K 5/00* (2006.01)
*A01K 7/00* (2006.01)
*A01K 29/00* (2006.01)

(52) U.S. Cl. .................. 119/69.5; 119/52.2; 119/51.5

(58) Field of Classification Search .......... 119/460, 119/51.01, 51.5, 52.1, 52.2, 57.8, 72, 74; 47/65.5, 66.6
See application file for complete search history.

(56) References Cited

U.S. PATENT DOCUMENTS

| | | | |
|---|---|---|---|
| 4,019,462 A | 4/1977 | Palfalvy | |
| 5,105,764 A | 4/1992 | Primeau | |
| D353,558 S | 12/1994 | Scott | |
| 5,749,316 A * | 5/1998 | Deagan | 119/57.8 |
| 5,937,787 A * | 8/1999 | Kopis | 119/57.8 |
| 6,079,951 A | 6/2000 | Morton | |
| 6,116,189 A * | 9/2000 | Rundle | 119/51.5 |
| 6,311,641 B1 * | 11/2001 | Johnson | 119/57.8 |
| 6,386,142 B1 * | 5/2002 | Holscher et al. | 119/57.8 |
| 6,513,284 B1 * | 2/2003 | Sandlin | 47/66.6 |
| 6,684,813 B1 | 2/2004 | Lemon | |
| 6,789,916 B2 * | 9/2004 | Ruggles | 362/154 |
| 6,792,891 B1 | 9/2004 | Coburn et al. | |
| 2005/0257749 A1 | 11/2005 | Kuelbs | |

* cited by examiner

*Primary Examiner*—Son T. Nguyen
(74) *Attorney, Agent, or Firm*—Gold & Rizvi, P.A.; H. John Rizvi; Glenn E. Gold

(57) ABSTRACT

A combination birdfeeder and fountain for outdoor use in one contained unit. The combination birdfeeder and fountain includes both a feeding station, and a fountain unit with circulating water. The combination birdfeeder and fountain addresses the basic needs of birds by providing a food storing and dispensing area, a fountain for drinking and bathing, and includes a means for illuminating the birdfeeder and fountain at night. The device may be operated by conventional power sources including AC, DC or solar energy, and may also include a heating means to warm the device in cold environments. An ornamental lighted device may be placed on top of the birdfeeder and fountain to further provide ornamental features, and illumination.

20 Claims, 3 Drawing Sheets

COMBINATION BIRDFEEDER AND FOUNTAIN

CROSS-REFERENCE TO RELATED APPLICATION

This application claims the benefit of U.S. Provisional Patent Application Ser. No. 60/789,809, filed Apr. 5, 2006, which is incorporated herein in its entirety.

FIELD OF INVENTION

The present invention relates to an apparatus and method for the feeding and caring of birds, and more specifically, to a combination birdfeeder and fountain for providing food and water for drinking and bathing.

BACKGROUND OF THE INVENTION

The benefits associated with birdfeeders and birdbaths or fountains are well known. Bathing is one of the essential needs birds have, alongside eating, drinking, shelter, and nesting. Bathing keeps the bird's feathers clean and flexible, and maintains the bird's skin and plumage in good order. Birds generally migrate to natural bodies of water such as streams, ponds, lakes, or puddles provided for in the wild. Many bird enthusiasts and bird watchers have encouraged birds to gather in the vicinity of their residential abode or home by providing the birds with food, water, and/or shelter. Many birdfeeders or birdbaths have been developed in the past for providing either food or water but typically not both in combination. The lack of providing both food and water in one convenient location often results in the birds traveling elsewhere to supplement one of the needed provisions.

The conventional birdfeeders or birdbaths have many drawbacks that make the use of such devices impractical. One drawback is that because of the fact that a bird feeder and a birdbath serve two different purposes, an intended user is forced to purchase and install two separate units thus increasing costs, and space. Another drawback is that many birdfeeders or birdbaths include complex integrated parts such as valves, floats, or level controls that makes assembly or disassembly difficult or frustrating. Convenient disassembly is desired because it permits a user to easily clean or maintain the birdfeeder or birdbath. Further, many devices are often exposed to the elements, such as rain or snow, subjecting the bird food to undue moisture making it less appealing and inedible to birds. Still other drawbacks include birdfeeders or birdbaths that are bulky, heavy, and provide no means of illumination for allowing the birds to easily locate food and water in the evening hours.

Accordingly, there is a need for a compact combination birdfeeder and fountain that is easy to assemble and disassemble for cleaning and maintenance, is inexpensive to manufacture and purchase by reducing the costs of having to purchase separate units, and provides pleasant ornamental features. There is also a need for a combination birdfeeder and birdbath assembly that can be easily transported and stored, includes a means of illumination for allowing birds to access the apparatus at night, and provides a single station for allowing birds to eat and bathe.

SUMMARY OF THE INVENTION

The present invention overcomes the deficiencies of the known art and the problems that remain unsolved by providing a combination birdfeeder and birdbath assembly that is easy to assemble or disassemble, provides nourishment to birds in the form of food and water for drinking and bathing, and includes a means for illuminating the assembly at night. Moreover, the overall construction of the combination birdfeeder and birdbath assembly provides a single, compact unit that includes durable structural features designed to shield the bird food from moisture.

In accordance with one embodiment of the present invention there is provided a birdfeeder and birdbath assembly, the birdfeeder and birdbath assembly comprising in combination a feeder unit including a base having at least one food receiving compartment, a dispenser including at least one dispensing orifice, where the base and the dispenser are attached together to form a reservoir for holding bird food. A top is detachably connected to the dispenser for sealing the food within the reservoir. A lighting cone housing a means for illuminating, and including a fountain dispensing plate is attached to the base. The combination birdfeeder and birdbath further includes a fountain unit including a basin reservoir for holding water, a fountain base, and a fountain cone housing a pump and tubing assembly, one end of the fountain cone is attached to an end of the lighting cone, and another end of the fountain cone is disposed within the basin reservoir so that the pump and tubing assembly is in fluid communication with the water.

Preferably, the at least one dispensing orifice includes a plurality of dispensing orifices, and the at least one food receiving compartment includes a plurality of food receiving compartment, each dispensing orifice being in communication with a corresponding food receiving compartment. In addition, the top extends outwards over the base to shield the food held within each food receiving compartment, and any birds perched on the base from rain, and snow.

Preferably, the lighting cone and the fountain cone each comprise an inverted funnel-shaped member, each funnel-shaped member comprising equal or different lengths and diameters.

Advantageously, the combination birdfeeder and birdbath includes a lighted ornamental device attached to the top, and the means for illuminating and the lighted ornamental device comprises any one of light bulbs, fiber optics, neon lights, solar powered lights, LEDS, or optical generators, having the same color or a variety of different colors.

In operation, the lighted ornament device, the means for illuminating and the pump are electrically connected to a power source to illuminate the birdfeeder and birdbath assembly at night. The pump is operated to circulate water upwards from the basin reservoir through the tubing assembly to direct water to drip from the dispensing plate into the basin reservoir by gravity. The power source includes any one of an AC source, a DC source such as one or more batteries, or one or more solar cells.

Optionally, the combination birdfeeder and birdbath includes a heating device that is electrically connected to the power source for generating heat to warm the birdfeeder and birdbath assembly.

The invention includes a method of providing food and water to birds. In one embodiment the first step is constructing a combination birdfeeder and birdbath assembly, the assembly comprising a feeder unit including a base having at least one food receiving compartment, a dispenser including at least one dispensing orifice, the base and the dispenser being attached together to form a reservoir for holding bird food, and a top including a lighted device where the top detachably connected to the dispenser for sealing the food within the reservoir. A lighting cone housing a means for illuminating, and including a fountain dispensing plate is attached to a one end of the lighting cone.

A fountain unit is also constructed and includes a basin reservoir for holding water, a fountain base, and a fountain cone housing a pump and tube assembly.

The invention includes a method of assembling the combination birdfeeder and birdbath. In assembly, another end of said lighting cone is attached to the base, and the one end to a first end of the fountain cone, and wherein a second end of the fountain cone is disposed within the basin reservoir so that the pump and tubing assembly is in fluid communication with the water wherein the feeder unit, the cones and the fountain base are assembled together in vertical orientation.

The method of providing food and water to birds also includes the step of securing the combination birdfeeder and birdbath on a planar surface, via, the fountain base, or alternatively hanging the combination birdfeeder and birdbath from a hanger. A further step includes placing bird food within the reservoir such that the food passes through the at least one dispensing orifice to rest within the at least one food receiving compartment, and detachably connecting the top to the dispenser, and then filling the basin reservoir with water.

The method of providing food and water to birds further includes the step of electrically connecting the lighted device, the means for illuminating and the pump to a power source to illuminate the birdfeeder and birdbath assembly at night, and to circulate water upwards from the basin reservoir through the tubing assembly to direct water to drip from the dispensing plate into the basin reservoir by gravity.

Regarding the embodiments described herein, as well as those covered by the claims, the elements of the combination birdfeeder and birdbath may be fabricated from any one of glass, plastic, ceramic, cement, wood, fiberglass or any combination thereof. The dispenser may or may not be transparent for allowing a user to view the contents stored therein. The cones may or may not also be transparent. In addition, the combination birdfeeder and birdbath may be configured to include a variety of shapes and sizes and may or may not be permanently assembled.

DETAILED DESCRIPTION

One or more embodiments of the present invention are disclosed herein. It will be understood that the disclosed embodiments are merely exemplary of the invention that may be embodied in various and alternative forms. The appended figures may be exaggerated or minimized to show details of particular embodiments, features, or elements. Specific structural and functional details, dimensions, shapes, or configurations disclosed herein are not limiting but serve as a basis for teaching a person of ordinary skill in the art the described and claimed features of embodiments of the present invention.

Figure 1:
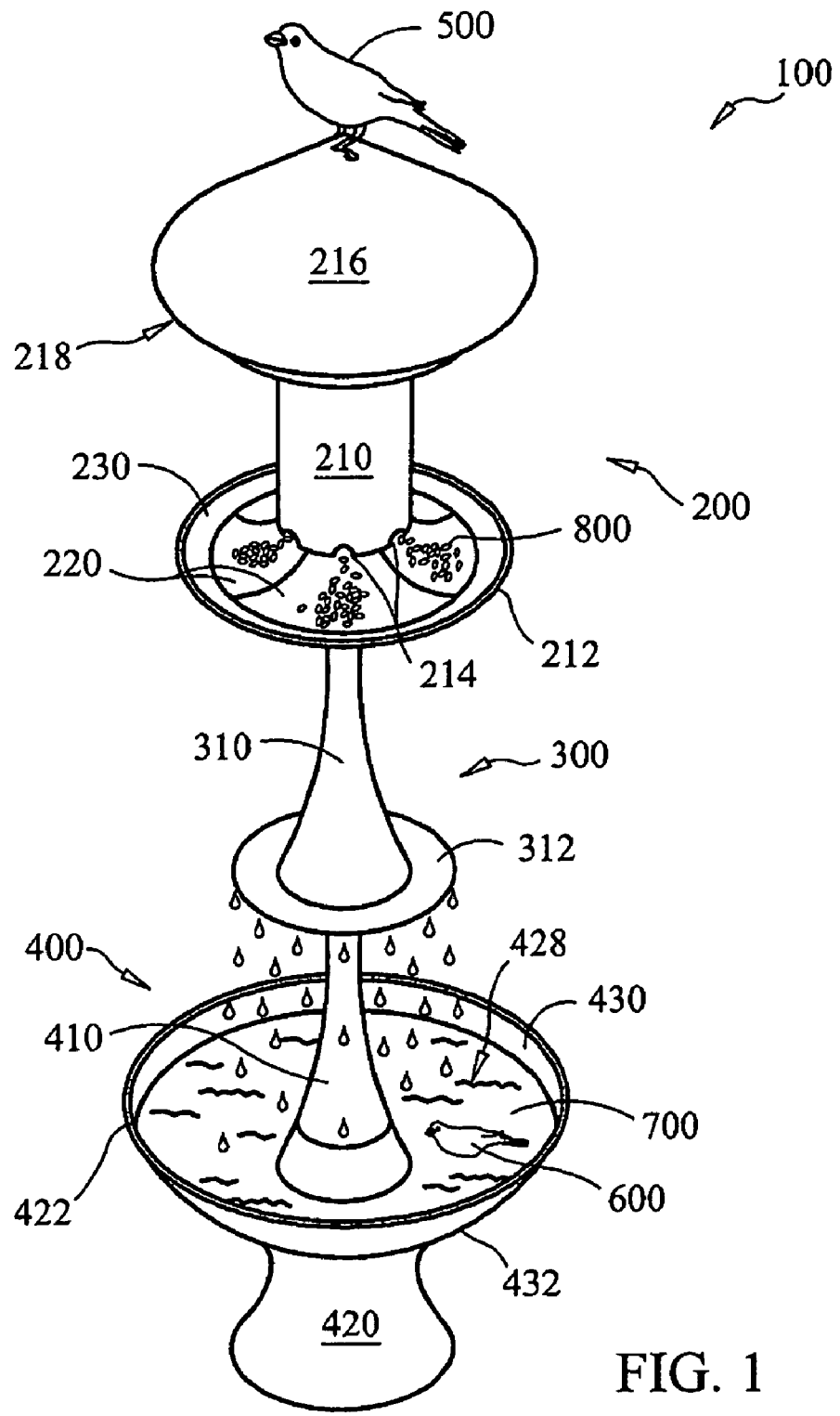
FIG. 1. shows a perspective view of a combination birdfeeder and birdbath assembly, in accordance with one embodiment of the present invention.

Referring now to the drawings wherein like elements are represented by like numerals throughout, there is shown in FIG. 1, a perspective view of a combination birdfeeder and birdbath or fountain 100 according to one embodiment of the present invention. The combination birdfeeder and birdbath 100 comprises a feeding unit 200, an illuminating unit 300, and a fountain unit 400. The units 200, 300, 400, are detachably assembled together to form the combination birdfeeder and birdbath 100.

The feeding unit, generally denoted at 200, includes a food dispenser 210 that is releasably attached to a feeder base 212. The feeder base 212 and food dispenser 210 couple together to define a storage reservoir for holding food 800 for birds. The feeder base 212 includes at least one food receiving compartment 220 for receiving food 800 that is dispensed from the storage reservoir of the food dispenser 210, by gravity. The at least one food receiving compartment 220 may comprises a single annular food compartment having a predefined depth, or a plurality of individual food compartments each compartment having a predefined depth and separated from each other by dividers. The feeder base 212 further includes a feeding surface 230 forming the outside perimeter of feeder base 212 for allowing birds to perch themselves on the feeder base 212 while eating or resting.

As illustrated in FIG. 1, food dispenser 210 includes a plurality of dispensing openings 214 where each dispensing opening 214 is in communication with a corresponding food compartment 220. Each dispensing opening 214 is shaped and sized to provide a controlled release of bird food 800 into each food receiving compartment 220. The food dispenser 210 is sized to provide a predetermined storage capacity to hold a desired amount of bird food 800 to reduce the need of constant replenishment. It will be noted that the food dispenser 210 may or may not be transparent for allowing a person to see the contents therein.

A feeder top 216, overhang or awning is releasably attached to the food dispenser 210 for sealing the bird food 800 within the storage reservoir of the food dispenser 210. The feeder top 216 has a sloped superior surface 218 that extends outwards over the feeder surface 230 of the feeder base 212 for sheltering birds that perch on the feeder surface 230 of the feeder base 212, and/or the food 800 that is disposed within each food compartment 220, from the elements such as rain or snow. The feeder top 216 is releasably attached to food dispenser 210 by any means known in the art including, but not limited to, threads, screws, snap-like features, a bayonet connection, magnets, hinges, clamps, clips, nuts and bolts, or the like.

With continued reference to FIG. 1, the illuminating unit 300 includes a lighting cone 310 including a hollow central opening for housing a means for illuminating the combination birdfeeder and birdbath 100 at night or in the early morning hours where there is limited daylight. The lighting cone 310 comprises an inverted funnel-like member that includes a first end, and a second end having a larger diameter than the first end. The lighting cone 310 further includes a fountain dispensing plate 312 for water 700 to cascade down into a basin reservoir 428. The dispensing plate 312 may be molded integrally with the lighting cone 310 or attached separately to the second end of the lighting cone 310. To further enhance the ornamental features of the combination birdfeeder and fountain 100, the lighting cone 310 may or may not be transparent or alternatively include a variety of different colors.

The means for illuminating may include any suitable lighting devices known in the art including, but not limited to, light bulbs, fiber optics, solar powered lights, LEDS, or neon lights. Alternatively, the means for illuminating may comprise a non-electrical means of illuminating such as optical reflectors, magnifiers, chemiluscent sticks, or glow sticks, or any other suitable lighting device. In addition, the means for illuminating may or may not comprise a variety of different colors for enhancing the ornamental design of the combination birdfeeder and birdbath 100.

As shown in FIG. 1, the fountain unit 400 includes a fountain base 420, and a basin 422 having an annular sidewall 430 integrally formed with a basin bottom 432 for defining a basin reservoir 428. The basin reservoir 428 is dimensionally configured to hold a predetermined amount of water 700 for allowing one or more birds 600 to drink from or bathe in. The basin 422 may be molded integrally with the fountain base 420 or alternatively, the basin 422 may be detachably coupled to the fountain base 420 as a separate unit to form the fountain unit 400. The fountain base 420 provides structural stability for supporting the feeding unit 200, cones 310, 410, basin 422, water 700 and any birds 600 thereabout.

With continued reference to FIG. 1, the fountain unit 400 also includes a fountain cone 410 comprising an inverted funnel-like member having a first end and a second end having a diameter that is larger than the first end. The fountain cone 410 houses a pump 440 and tubing assembly 442. A first end of fountain cone 410 is attached to dispensing plate 312, and a second end of the fountain cone 410 is affixed within the center of the basin 422 so that the pump 440 and tubing assembly 442 are in fluid communication with the basin reservoir 428 for pumping or cycling water 700 from the basin reservoir 428 through the fountain cone 410, via, the tubing assembly 442. The water 700 cascades from the fountain dispensing plate 312 and drips into basin reservoir 428. Those skilled in the art will appreciate that the structural elements of the fountain cone 410 preferably utilizes the standard method of recycling water in fountains. In the preferred embodiment, the means for pumping includes a small water pump that may pump on a continuously or intermittent basis over predetermined timed intervals.

To enhance both the ornamental features of the present invention and to provide additional illumination to the combination birdfeeder and birdbath 100, a lighted ornament 500 is disposed on the outer surface of feeder top 216. The lighted ornament 500 comprises any configuration, figure, character, number, or letter, and houses a lighting device that may include any one of light bulbs, fiber optics, solar powered lights, LEDS, optical reflectors or magnifiers, chemiluscent sticks, glow sticks, neon lights or any other suitable lighting devices known in the art. In one exemplary embodiment, the lighted ornamental device 500 comprises a lighted device in the shape of a bird so as to compliment the intended use of the combination birdfeeder and fountain 100.

Figure 2:
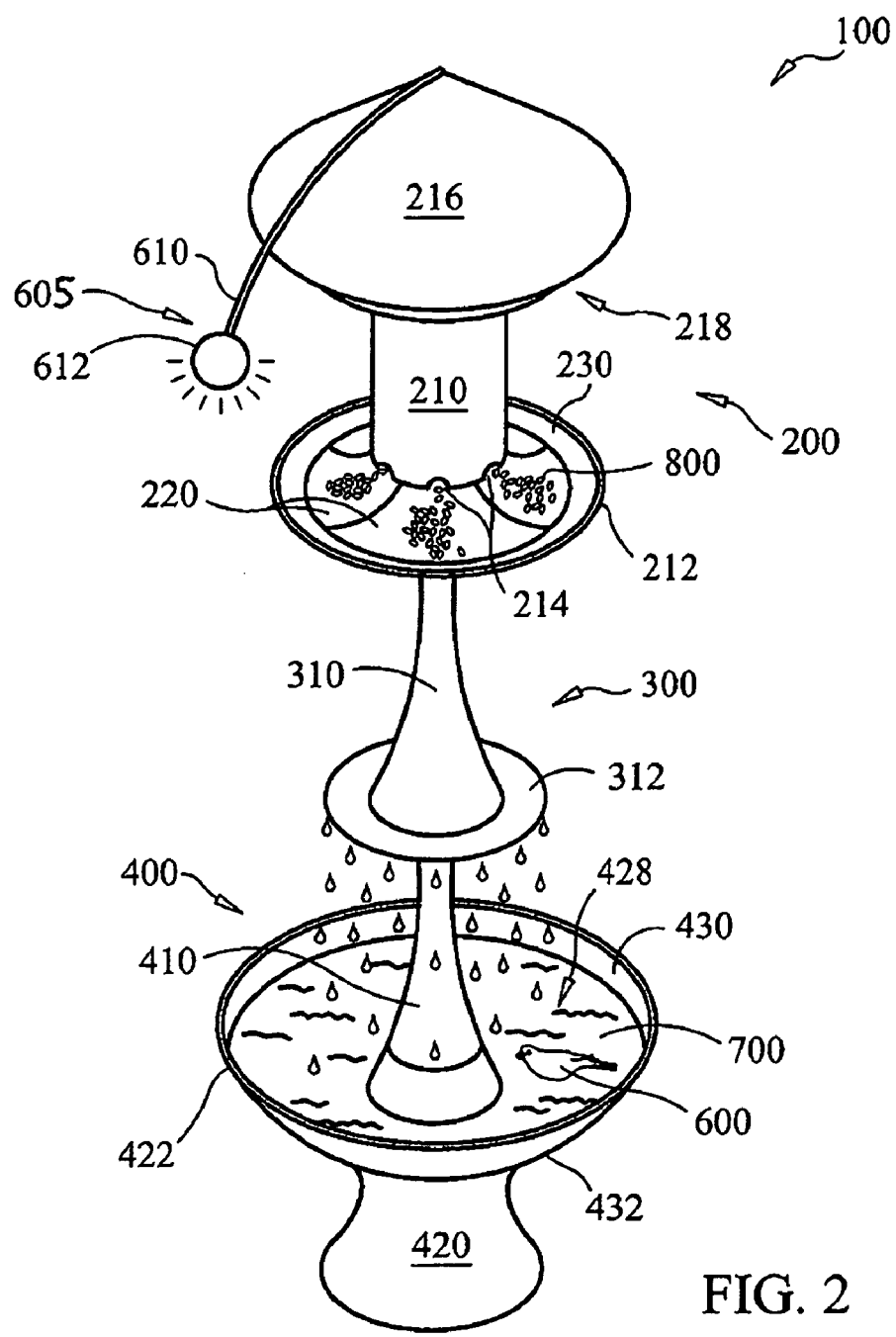
FIG. 2. shows a perspective view of a combination birdfeeder and birdbath assembly, in accordance with an alternative embodiment of the present invention.
Figure 3:
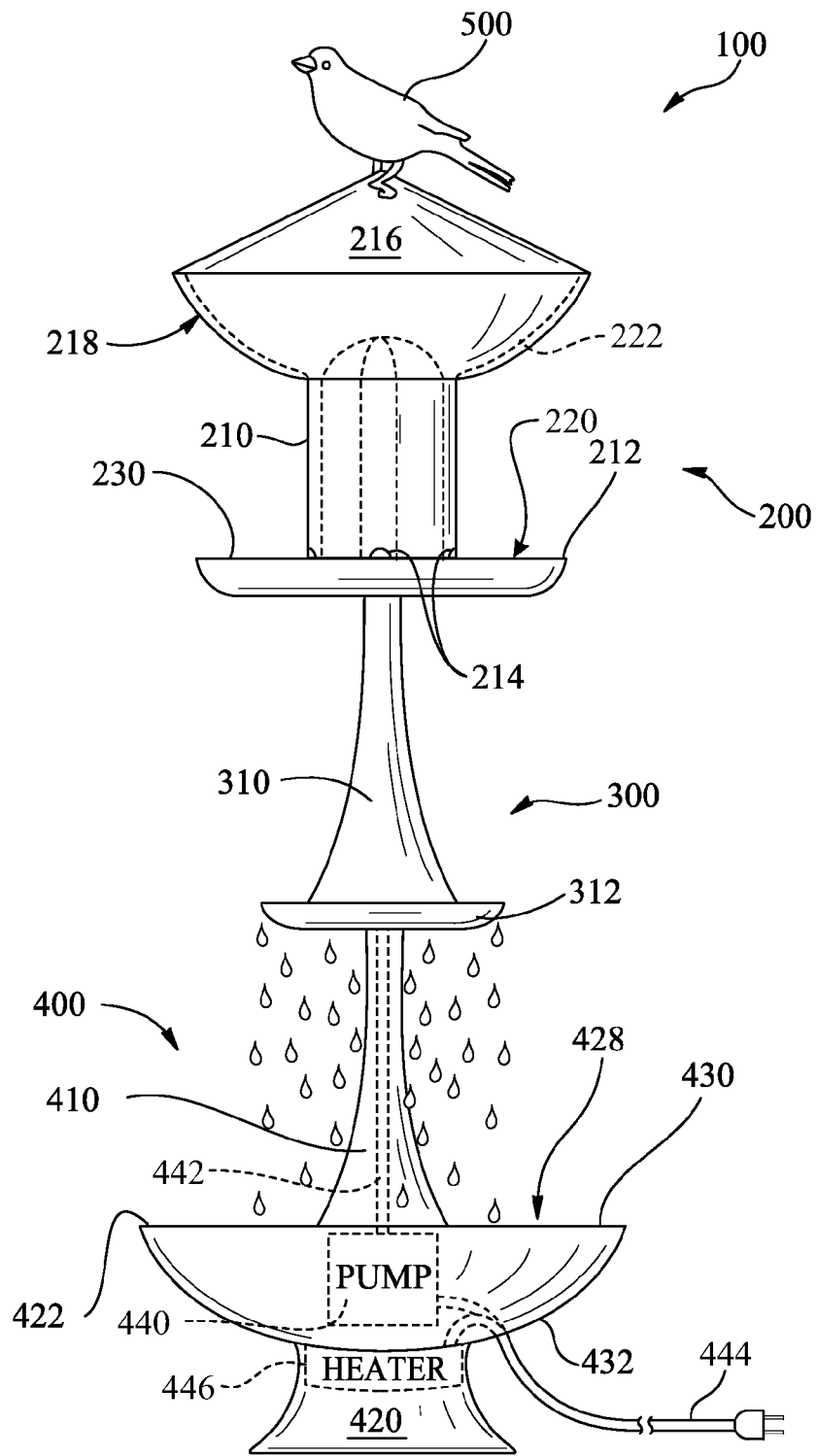
FIG. 3 shows an elevation view of a combination birdfeeder and birdbath assembly, in accordance with an alternative embodiment of the present invention, introducing internally located functional features.

Referring now to FIG. 2, there is provided a combination birdfeeder and fountain assembly 100, according to an alternative embodiment of the present invention. The elements, features, dimensions, —and configurations defining the combination birdfeeder and birdbath 100 as described in the embodiment of FIG. 1 above, are the same as the elements, features, dimensions, and configurations as illustrated in the embodiment of FIG. 2, except for an alternative lighting ornament 605. The combination birdfeeder and birdbath 100 of FIG. 2, includes an alternative lighted ornament 605 that replaces the lighted ornament 500 depicted in FIG. 1. The lighted ornament 605 includes a stem 610 having a lighted element 612 disposed at a distal end of the stem 610 for providing more light to the feeding unit 200, and fountain unit 400 of the combination birdfeeder and birdbath 100. One end of stem 610, opposite the end including lighted element 612, is attached to the outer surface of feeder top 216. The stem 610 may comprise a rigid or flexible member comprising any one of plastic, rubber, metal, ceramic or glass.

It should be noted to those skilled in the art that a variety of lighting sources may be provided for the lighted ornament 605.

The combination birdfeeder and birdbath 100 may further include a heating element (not pictured) for keeping the combination birdfeeder and birdbath 100 warm in the winter months. The heating element may be used to generate heat to warm the birds 600, and/or to melt any ice that may build-up or accumulate on the surface of the birdfeeder and birdbath 100. The heating element 446 may be disposed on any surface of the combination birdfeeder and birdbath 100, and may comprise any one of electric resistance wire, carbon heater, resistors, heating tape, an electric heater, or the like.

The lighted ornament 500, 605, means for illuminating, and water pump 440 are electrically coupled to a power source 444 that comprises an AC or DC power source such as a standard home AC outlet, or one or more batteries. An alternative power source may comprise one or more solar cells for converting light into electrical power. Further, the combination birdfeeder and birdbath 100 may also include electronic circuitry for controlling the operation of the lighted ornament 500, 605, means for illuminating and/or water pump 440. The electronic circuitry may include timers, pulsing circuits, programmable features, converters, or the like.

The elements of the present invention may be fabricated from any strong, durable, material including a natural or synthetic material, fiberglass, acrylic, glass, plastic, hard rubber, ceramic, metal, cement, concrete, wood or any combination thereof. Alternatively, the combination birdfeeder and fountain 100 may comprise a lightweight material, and include a means for hanging the device from a tree or post where the means for hanging may include brackets, wires, rope, clips, clamps, hangers, or any other suitable means for securely hanging the birdfeeder and fountain 100.

In assembly and use, the combination birdfeeder and fountain 100 is assembled such that the feeding unit 200, illuminating cone 300, and fountain unit 400 are releasably attached together using any one of threads, screws, clips, posts, nuts and bolts, snap-together features, clamps, lugs, adhesive, glue, cement, nails, or any combination thereof. The food dispenser 210 is attached to feeder base 212 so that each dispensing opening 214 formed within the food dispenser 210 is in communication with each food receiving compartment 220. Bird food 800 is disposed within the storage reservoir 222 of the food dispenser 210 allowing the food 800 to flow through each dispensing opening 214 into each food compartment 220. The feeder top 216 is releasably attached to the food dispenser 210 sealing the bird food 800 within the storage reservoir. The fountain base 420 of the combination birdfeeder and birdbath 100 is placed on a planar surface, or alternatively, the combination birdfeeder and birdbath 100 is hung from a tree, the eaves of a house, a pole, or other suitable position where birds 600 are safe from predators in general. The basin reservoir 428 is filled with an appropriate amount of water 700, and power is provided to the lighted ornament 500, 605, means for illuminating and water pump 440 to light the combination birdfeeder and birdbath 100 during evening hours, and to circulate the water from the basin reservoir 428 up through the fountain cone 410 to cascade from the fountain dispensing plate 312 and into basin 422.

One or more birds 600 stands on the feeding surface 230 to rest or to eat the dry food 800 that has been dispensed from the feed dispenser 210 into each food compartment 220. The sloped superior surface 218 of feeder top 216 is configured to shield both the food 800 and any birds 600 present from the elements. Further, one or more birds 600 may optionally bathe within the basin reservoir 428 of the fountain unit 400 without having to leave the abode to seek water 700 elsewhere. Birds may fully enjoy the use of the combination birdfeeder and birdbath 100 during evening hours as a result of the lighted ornament 500, 605 and means for illuminating.

It should be emphasized that the above-described embodiments are merely exemplary illustrations of implementations set forth for a clear understanding of the principles of the invention. Many variations, combinations and modifications may be made to the above-described embodiments without departing from the scope of the invention as defined and intended by the following claims.

What is claimed is:

1. A birdfeeder and birdbath assembly, the birdfeeder and birdbath assembly
    comprising in combination:
        a feeding unit including a base having at least one food receiving compartment, a dispenser including at least one dispensing opening, said base and said dispenser attached together to form a reservoir for holding bird food, and a top detachably connected to said dispenser for sealing said food within said reservoir;
        a lighting cone housing a means for illuminating, and including a fountain dispensing plate, one end of said lighting cone attached to said base; and
        a fountain unit including a basin reservoir for holding water, a fountain base, and a fountain cone housing a pump and tube assembly, one end of said fountain cone attached to another end of said lighting cone, and another end of said fountain cone disposed within said basin reservoir so that said pump and tube assembly is in fluid communication with said water.

2. The combination birdfeeder and birdbath of claim 1, wherein said at least one
    dispensing opening includes a plurality of dispensing openings, and said at least one food receiving compartment includes a plurality of food receiving compartment, each dispensing openings being in communication with a corresponding food receiving compartment.

3. The combination birdfeeder and birdbath of claim 2, wherein said top extends outwards over said base to shield the food held within each food receiving compartment, and any birds perched on said base from rain, and snow.

4. The combination birdfeeder and birdbath of claim 3, wherein said lighting cone and said fountain cone each comprise an inverted funnel-shaped member, each funnel-shaped member comprising equal or different lengths and diameters.

5. The combination birdfeeder and birdbath of claim 4, further including a lighted
    ornamental device attached to said top.

6. The combination birdfeeder and birdbath of claim 5, wherein said means for illuminating and said lighted ornamental device comprises any one of light bulbs, fiber optics, solar powered lights, neon lights, LEDS, or optical generators, said means for illuminating and said lighted ornamental device having the same color or a variety of different colors.

7. The combination birdfeeder and birdbath of claim 6, wherein said lighted ornamental device, said means for illuminating and said pump are electrically connected to a power source to illuminate said birdfeeder and birdbath assembly, and to circulate water upwards from said basin reservoir through said tube assembly to allow water to drip from said dispensing plate into said basin reservoir by gravity, said power source including any one of an AC source, a DC source, one or more batteries, or one or more solar cells.

8. The combination birdfeeder and birdbath of claim 7, further including a heating device, said heating device electrically connected to said power source for generating heat to warm said birdfeeder and birdbath assembly.

9. A combination birdfeeder and fountain comprising:
    a feeding station including a base having one or more food compartments, a storage receptacle attached to said base for storing bird food, said storage receptacle including one or more apertures in communication with said one or more food compartments for allowing food to pass through said one or more apertures into each corresponding food compartment, and a top detachably connected to said receptacle;
    a cone member including a means for illuminating, a first end, and a second end having a fountain plate, said first end attached to the base of said feeding station; and
    a fountain unit including a basin for holding water, a fountain base, and a fountain cone housing a pump and tubing assembly, one end of said fountain cone being attached to said fountain plate, and another end of said fountain cone affixed within said basin so that the pump and tubing assembly are in fluid communication with said water.

10. The combination birdfeeder and fountain of claim 9, wherein each cone comprises an inverted funnel-shaped member, each inverted funnel-shaped member comprising the same or different sizes and shapes.

11. The combination birdfeeder and fountain of claim 10, wherein said means for illuminating and said pump are electrically connected to a power source to illuminate said birdfeeder and fountain, and to circulate water upwards from said basin through said tubing assembly to allow the water to drip from said fountain plate into said basin.

12. The combination birdfeeder and fountain of claim 11, wherein said feeding station, said cone member and said fountain unit comprises any one of plastic, metal, wood, glass, cement, ceramic, fiberglass, acrylic, or any combination thereof.

13. The combination birdfeeder and fountain of claim 12, further including a lighted
    ornamental device attached to said top, said lighted ornamental device electrically connected to said power source.

14. The combination birdfeeder and fountain of claim 13, wherein said means for illuminating and said lighted ornamental device comprises any one of light bulbs, fiber optics, solar powered lights, neon lights, LEDS, optical reflectors or magnifiers or any other suitable lighting device.

15. The combination birdfeeder and fountain of claim 14, wherein said power source includes any one of AC, one or more batteries, or one or more solar cells.

16. The combination birdfeeder and fountain of claim 15, further including a heating device, said heating device electrically connected to said power source for generating heat to warm said birdfeeder and fountain combination.

17. A method of providing food and water to birds, comprising the steps of:
    constructing a combination birdfeeder and birdbath assembly comprising:
    a feeder unit comprising a base including at least one food receiving compartment, a dispenser including at least one dispensing orifice, said base and said dispenser attached together to form a reservoir for holding bird food, and a top including a lighted device, said top detachably connected to said dispenser for sealing said food within said reservoir;

a lighting cone housing a means for illuminating, and including a fountain dispensing plate attached to a one end of said lighting cone;

a fountain unit including a basin reservoir for holding water, a fountain base, and a fountain cone housing a pump and tube assembly; and assembling said combination birdfeeder and birdbath assembly wherein another end of said lighting cone is attached to said base, one end said fountain cone attached to said dispensing plate, and another end of said fountain cone disposed within said basin reservoir so that said pump and tubing assembly is in fluid communication with said water, said feeder unit, said cones and said fountain base being assembled together in vertical orientation.

18. The method of claim 17, further including the step of securing said combination birdfeeder and birdbath assembly on a planar surface by said fountain base, or hanging said combination birdfeeder and birdbath assembly from a hanger.

19. The method of claim 18, further including the step of placing bird food within said reservoir such that said food passes through said at least one dispensing orifice to fall within said at least one food receiving compartment, detachably connecting said top to said dispenser, and filling said basin reservoir with water.

20. The method of claim 19, further including the step of electrically connecting said
lighted device, said means for illuminating and said pump to a power source to illuminate said birdfeeder and birdbath assembly, and to circulate water upwards from said basin reservoir through said tubing assembly to direct water to drip from said dispensing plate into said basin reservoir by gravity.

* * * * *